July 24, 1956 C. W. MacMILLAN 2,755,554
AUTOMOTIVE WHEEL ALIGNMENT TESTING DEVICE
Filed May 22, 1952 10 Sheets-Sheet 2

Inventor:
Charles W. MacMillan
By Gary, Desmond & Parker
Attys.

July 24, 1956                 C. W. MacMILLAN                  2,755,554
                    AUTOMOTIVE WHEEL ALIGNMENT TESTING DEVICE
Filed May 22, 1952                                      10 Sheets-Sheet 5

Inventor
Charles W. MacMillan
By Gary, Desmond & Parker
Attys.

July 24, 1956   C. W. MacMILLAN   2,755,554
AUTOMOTIVE WHEEL ALIGNMENT TESTING DEVICE
Filed May 22, 1952   10 Sheets-Sheet 6

Inventor:
Charles W. MacMillan
By Gary, Desmond & Parker
Attys.

July 24, 1956 C. W. MacMILLAN 2,755,554
AUTOMOTIVE WHEEL ALIGNMENT TESTING DEVICE
Filed May 22, 1952 10 Sheets-Sheet 7

Inventor:
Charles W. MacMillan
By Gary, Desmond & Parker
Attys.

July 24, 1956  C. W. MacMILLAN  2,755,554
AUTOMOTIVE WHEEL ALIGNMENT TESTING DEVICE
Filed May 22, 1952  10 Sheets-Sheet 9

Inventor:
Charles W. MacMillan
By Gary, Desmond & Parker Attys.

July 24, 1956  C. W. MacMILLAN  2,755,554
AUTOMOTIVE WHEEL ALIGNMENT TESTING DEVICE
Filed May 22, 1952  10 Sheets-Sheet 10

Inventor:
Charles W. MacMillan
By Gary, Desmond & Parker Attys.

United States Patent Office 2,755,554
Patented July 24, 1956

2,755,554

AUTOMOTIVE WHEEL ALIGNMENT TESTING DEVICE

Charles W. MacMillan, Rock Island, Ill., assignor to Bear Manufacturing Company, Rock Island, Ill., a corporation of Delaware Application May 22, 1952, Serial No. 289,261

8 Claims. (Cl. 33—46)

This invention relates to improvements in a wheel alignment device for testing the wheel alignment of the front wheels of an automotive vehicle.

The present invention comprises a device which is complete in that it is capable of measuring substantially all of the various angular relationships of the wheels of an automotive vehicle while the wheels are subjected to the forces which they encounter during actual operation of the vehicle.

Further, the device is rugged and of simple and economical construction and may be operated in a most simple and convenient manner.

The objects and advantages of the invention will be apparent from the accompanying drawings and following detailed description.

In the drawings,

Fig. 19 is a sectional view of a telescope employed in checking toe-in.

Fig. 20 is a top plan view of the device shown in Fig. 19.

Fig. 21 is a fragmentary front elevational view of the telescope showing the elongated sighting strip.

Fig. 22 is a front elevational view of the mirror assembly employed with the telescope in measuring toe-in.

Fig. 23 is a side elevational view of the device shown in Fig. 22.

Figure 1:
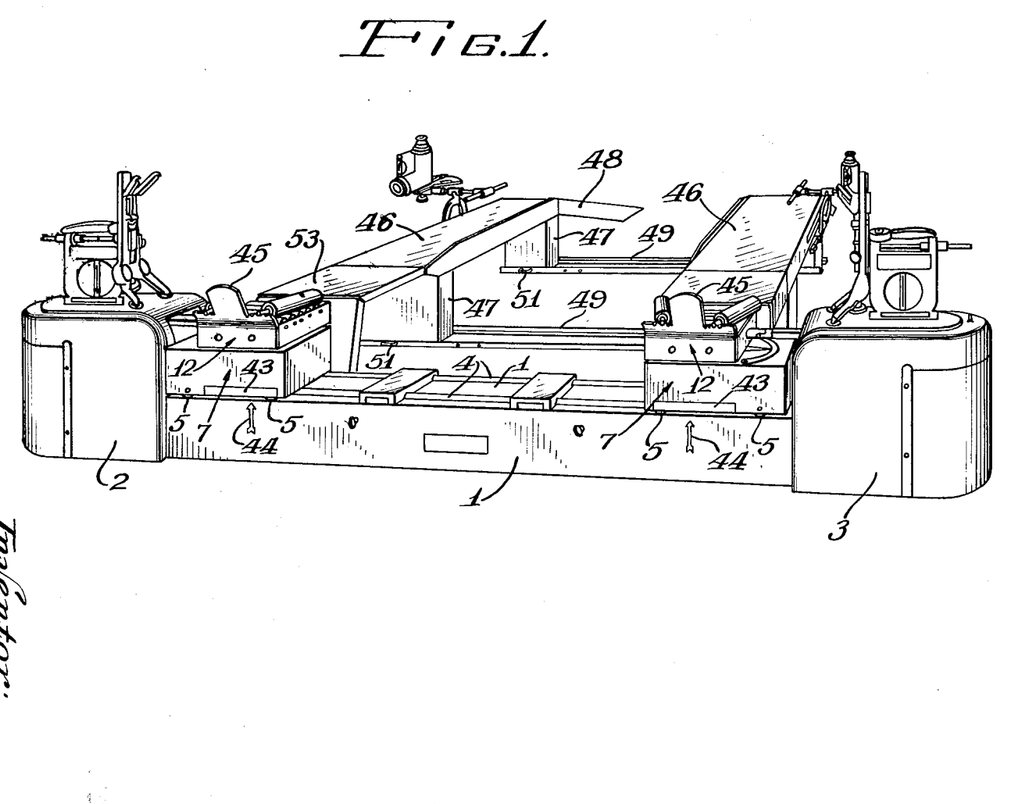
Fig. 1 is a perspective view of the machine as viewed from the front end thereof.

Referring in detail to the drawings, and with specific reference to Fig. 1, 1, 1 indicate a pair of channels which are disposed parallel to each other with the flanges of the channels extending toward each other in spaced relationship. Housings 2 and 3 are positioned at the opposite ends of the channels 1, 1, being the right hand and left hand housings, respectively, as viewed by the driver of a vehicle which may be carried upon the testing machine. Each of the housings 2 and 3 carries an electric motor (not shown) to be used in a manner to be hereinafter more fully described.

Figure 10:
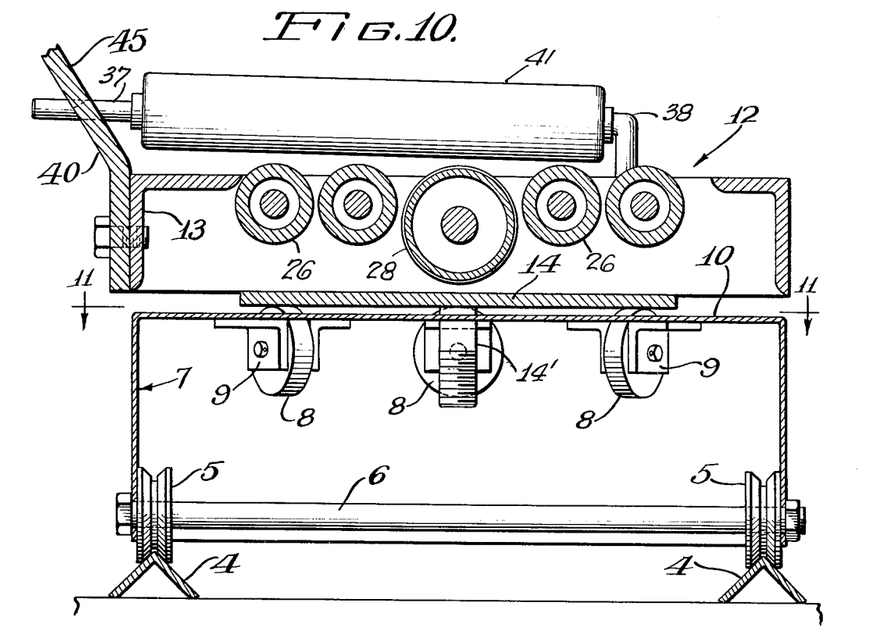
Fig. 10 is a sectional view taken on line 10—10 of Fig. 7.
Figure 11:
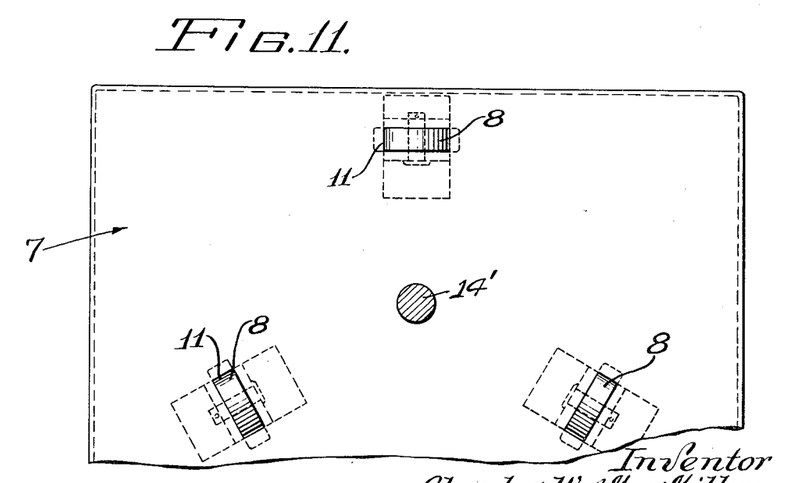
Fig. 11 is a sectional view taken on line 11—11 of Fig. 10.
Figures 12, 13, 14:
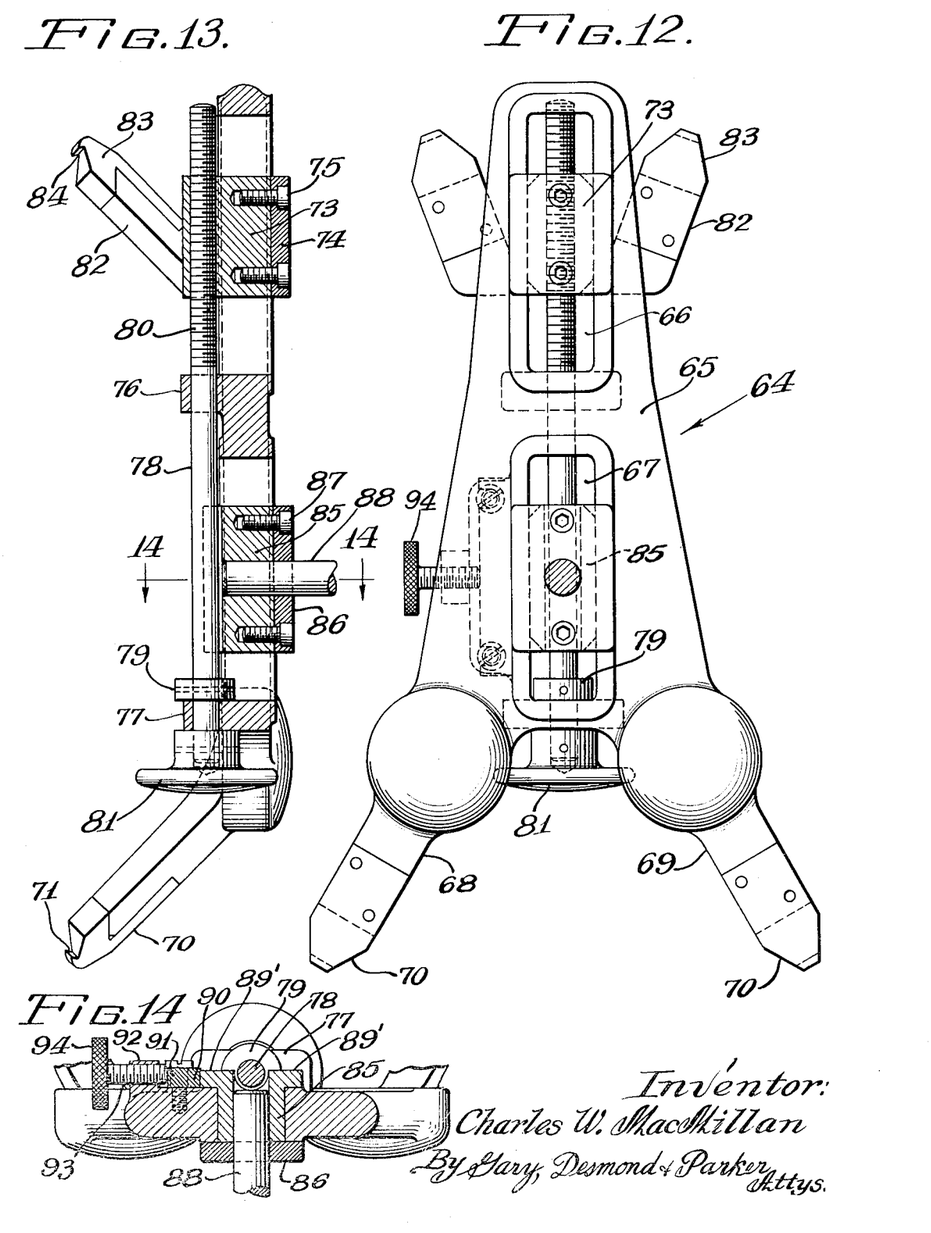
Fig. 12 is a detailed front elevational view of one of the wheel clamps employed.
Fig. 13 is a sectional view taken on line 13—13 of Fig. 12.
Fig. 14 is a transverse sectional view taken on line 14—14 of Fig. 13.
Figures 15, 16:
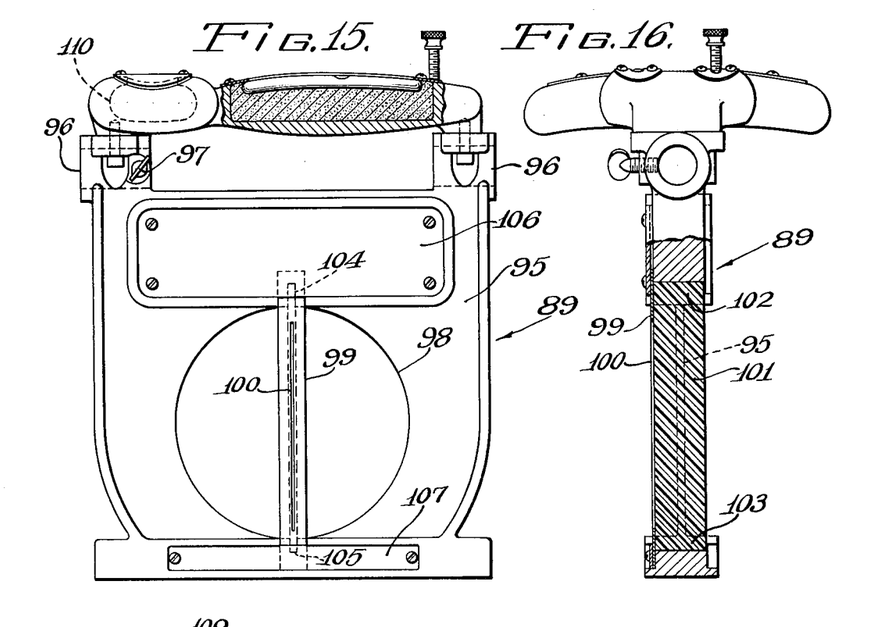
Fig. 15 is a side elevational view of one of the measuring heads employed in the machine.
Fig. 16 is a front elevational view, parts being shown in section of the head illustrated in Fig. 15.
Figures 17, 18:
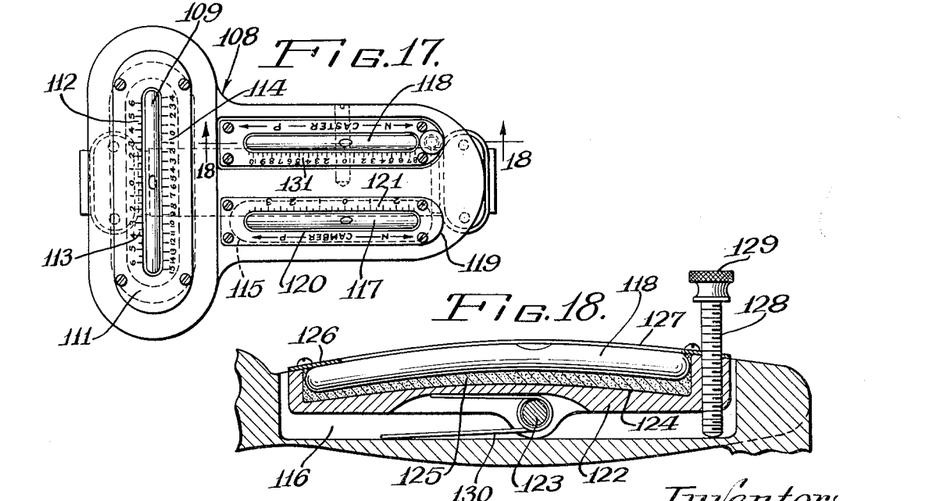
Fig. 17 is a top plan view of the measuring head shown in Fig. 16.
Fig. 18 is an enlarged detailed sectional view taken on line 18—18 of Fig. 17.

A pair of angle irons 4 are mounted upon the upper flanges of the channels 1, 1 with their angles extending upwardly, as shown best in Fig. 10. The angles 4 function as tracks for grooved rollers 5 carried upon two parallel shafts 6, only one of which is shown. The shafts 6 are carried by a carriage 7 which, by virtue of the rollers 5 is movable along the channels 1, 1. Two such carriages are contemplated, both identical, one being adapted to be disposed adjacent each housing 2 and 3 and being movable toward and away from each other along tracks 4.

Each of the carriages 7 carries three rollers 8 mounted upon brackets 9, which are, in turn, secured to the lower surface of a platform 10 comprising a portion of each carriage 7. The rollers are angularly spaced from each other 120° and the platform 10 is provided with three corresponding apertures through which a portion of the rollers 8 extend.

A turntable 12 is carried upon each of the carriages 7, each turntable comprising a box-like frame 13 which carries at its bottom a bearing plate 14, which, in turn, rests upon the protruding portions of the rollers 8, said bearing plate carrying a pivot pin 14' which projects through an aperture in platform 10. Thus the turntable is free to rotate relative to its supporting carriage. A bearing block 15 (Figs. 7 and 8) is carried upon the outer wall of the frame 13, being secured thereto by screws 15', said block being provided with a recess 16 in which a pin 17 is slidably positioned. A coil spring 18 bears upon the head of pin 17 and normally urges said pin downward from the recess 16. An aperture 19 is provided in each platform 10 whereby pin 17 may move thereinto to lock the turntable 12 with respect to the carriage 7 and prevent relative rotary movement of the two parts. A block 20 is mounted upon the bearing block 15 and is apertured to receive rod 21 which carries pin 17. A handle 22 is rigidly connected to the outer end of rod 21, said lever, adjacent the connection to rod 21, carrying a pin 23, the end of which bears upon block 20 under the influence of spring 18. When handle 22 is rotated the pin 23 comes into registration with an aperture 23' whereby pin 23 moves into aperture 23' and rod 21 moves downwardly whereby pin 17 engages in aperture 19.

In the opposite walls 24 of each of the turntable frames 13 four parallel shafts 25 are carried (Fig. 7), a roller 26, carrying ball bearing assemblies 27, being freely rotatably carried upon each of the shafts. The rollers 26 upon each turntable 12 are grouped in pairs with their surfaces adjacent each other and with their upper surfaces in a common plane. Between each pair of rollers 26 a relatively larger diametered roller 28 is carried upon a shaft 29, journaled in ball bearings 30, the roller 28 having a double spiral grooved surface, as shown best at 31 in Fig. 7. An end of shaft 29 extends outwardly from wall 24 and is secured to a conventional universal joint which, in turn, is also connected to a hollow square tubular shaft 33. The tubular shaft 33 slidably embraces a stub shaft 34 which, in turn, is connected by means of universal joint 35 to motor shaft 36. The motor shaft 36 comprises the shaft of the motor carried in one of the housings 2 or 3, the arrangement hereinbefore described applying to each side of the machine, that is, a driven roll 28 in each turntable being connected to the motor in an adjacent housing 2 and 3.

Figure 7:
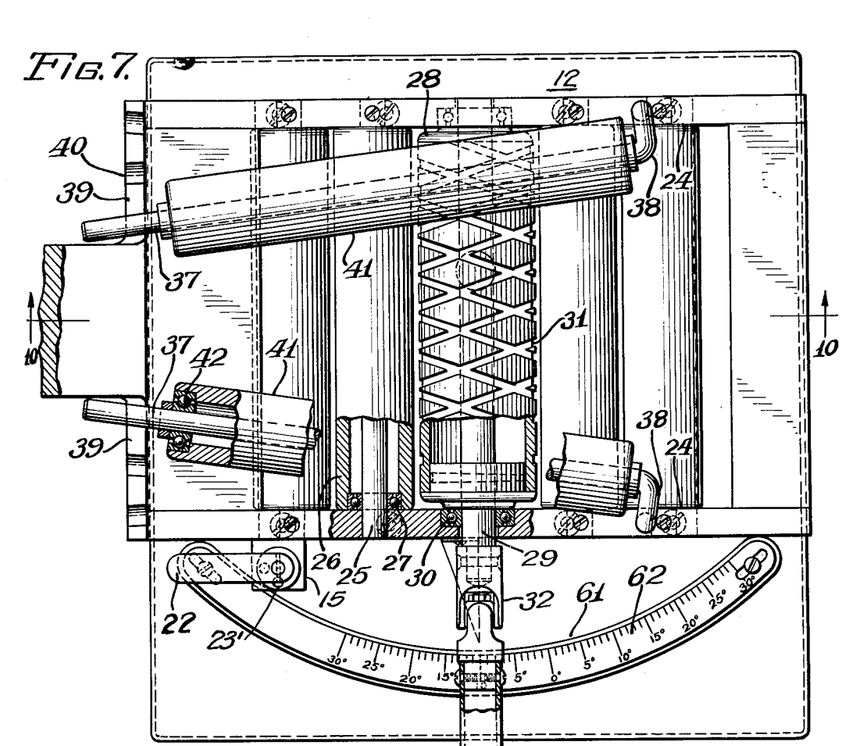
Fig. 7 is an enlarged detailed top plan view of one of the carriages.
Figure 8:
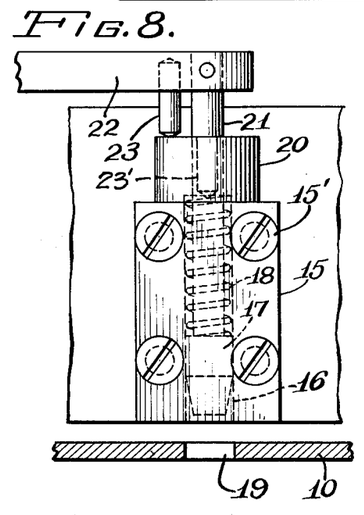
Fig. 8 is a detailed elevational view of a pin for locking a turntable to its supporting carriage.
Figure 9:
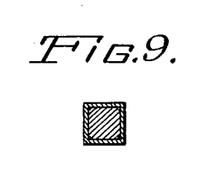
Fig. 9 is a sectional view taken on line 9—9 of Fig. 7.

A pair of shafts 37 are mounted upon the turntable 12, each of said shafts at one end being bent, as shown best at 38 in Fig. 7, the ends of said bent portions extending downwardly and being pivotally secured to the walls 24. The opposite ends of said shafts extend into slots 40 provided in a wall 39 secured to frame 13 whereby said shafts may swing angularly about the pivots throughout a limited degree. Rolls 41 are mounted on shafts 37, said rolls being freely rotatable about said respective shafts by virtue of the ball bearing assemblies 42.

As will be hereinafter more fully described, the turntables 12 are adapted to support the two front wheels of an automobile. The carriages may be rolled upon tracks 4 to accommodate the position of the turntables 12 to the tread width of the vehicle. Scales 43 (Fig. 1) may be carried upon the carriages which cooperate with indexes 44 upon the channel 1 to facilitate the presetting of the carriages for the reception of wheels of known tread width. It can readily be seen that the front wheels of the vehicle positioned upon the turntables 12 may be conveniently swung with the turntables when the pins 17 have been disengaged from the respective apertures 19.

A stop plate 45 may be carried upon the wall 40 of each of the turntables 12 at its central portion whereby to function as a convenient stop when moving the vehicle wheels upon the turntables. Rolls 41 function to center the automobile wheels upon the turntables while said wheels are supported by the rolls 26 and 28. Rolls 28 constitute driving rolls which are, in turn, driven from the motors carried in the housings 2 and 3, said rolls having grooved surfaces to facilitate the driving of the supported wheels and also to prevent lateral movement of the wheels during the driving operation. Rolls 26 merely assist in supporting the automobile wheels and provide a frictionless support for said wheels during the rotation thereof. By the provision of the square sectioned tubular shaft 33 carriages 7 may be moved toward or away from housings 2 and 3 without effecting the driving relationship of rolls 28 and the respective motors.

To the rear of the channels 1, 1 a pair of runways 46 are positioned, said runways being supported by upright members 47. The upper surfaces of the runways are in substantially the same plane as the plane of the upper surfaces of rolls 26 and 28 carried by turntables 12, and an automobile may be driven onto said runways by means of suitable ramps 48.

Figures 4, 5, 6:
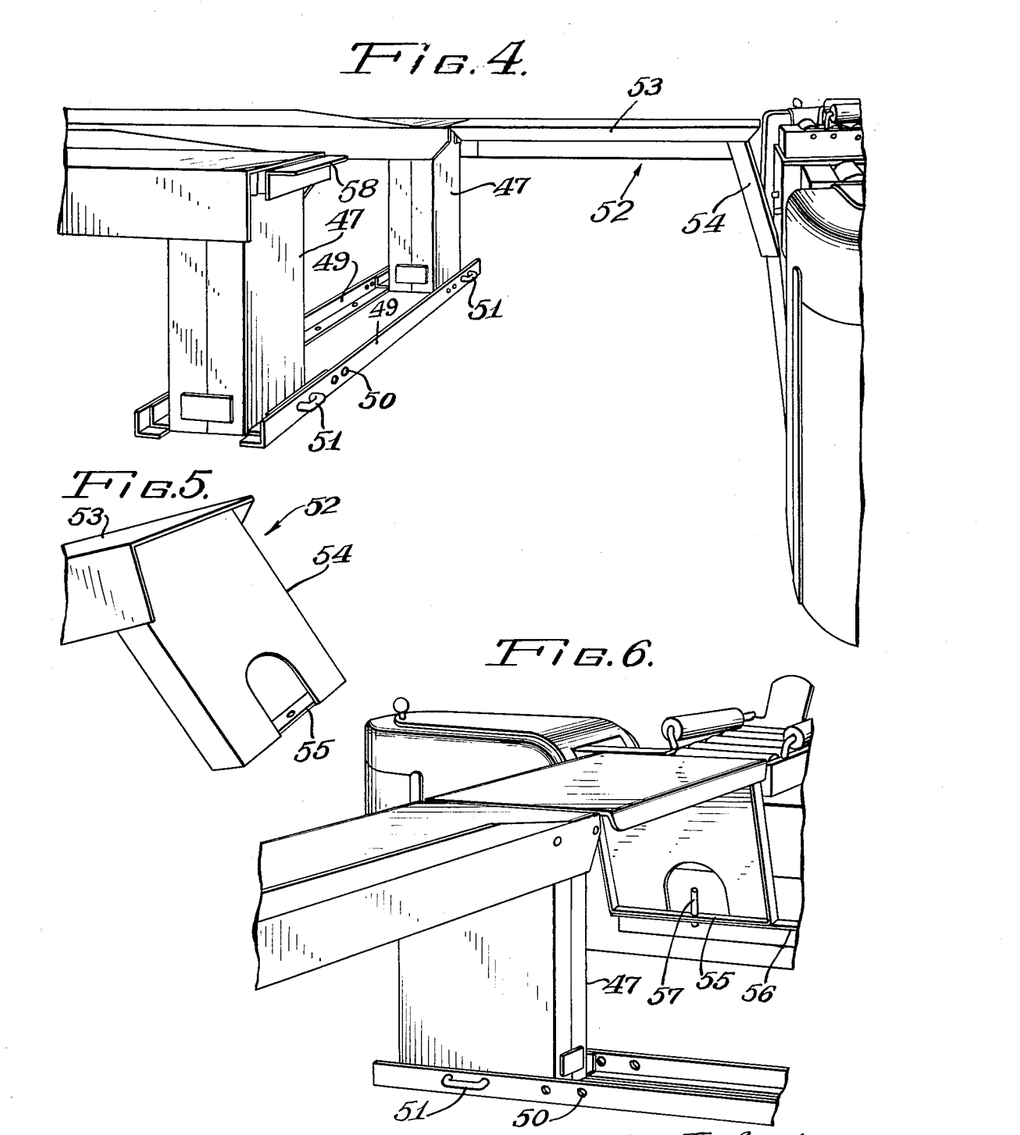
Fig. 4 is an enlarged detailed perspective view of a portion of the runways and an intermediate portion of the machine.
Fig. 5 is an enlarged fragmentary detailed perspective view of a portion of one of the runway bridge sections.
Fig. 6 is an enlarged detailed perspective illustrating a portion of the machine as viewed from between the runways and looking forwardly toward one side of the machine.

Referring particularly to Figs. 4 and 6, a pair of spaced angle irons 49 may be mounted upon a supporting floor in embracing relationship to the uprights 47. Pairs of apertures 50 may be provided in the upright flanges of the angle irons 49 and similar pairs of apertures (not shown) may be provided in the lower portions of the uprights 47, the arrangement being such that the uprights 47 and runways 46 may be moved toward and away from each other to conform their lateral spacing to the tread width of the vehicle wheels they support. When the uprights are spaced as desired, they may then be locked by means of staples 51 which extend through apertures 50 and into the apertures in the uprights.

The forward set of angle irons 49 are preferably spaced rearwardly from channels 1, 1, the spaces between the forward ends of the runways 46 and the turn-tables being bridged by bridging runways 52. The bridging runways 53 proper, which are adapted to be positioned in coplanar relationship to runways 46 also comprise supporting panels 54 which extend forwardly and downwardly from the forward ends of the runways 53. The lower ends of each of the supporting panels 54 carry an angle iron 55 which is adapted to be supported upon a flange of an angle iron 56 carried upon the rear face of the rear channel 1. Angle iron 56 is provided with a plurality of apertures (not shown) and angle iron 55 is provided with an aperture in which a pin 57 may be positioned to lock the supporting panel at a desired position relative to the channels 1, 1. The runways 53 proper are supported at their rear ends by angle irons 58 carried at the upper portions of each of the forward uprights 47.

The forward portion of the machine including the channels 1, 1, housings 2 and 3, carriages 7 and turntables 12 may be pit mounted in which case the runways, hereinbefore described, may be eliminated as the rolls 26 and 28 may be substantially coplanar with the floor in which the pit may be provided. Of course, either type of installation is contemplated in the present invention.

In employing the present device, an automobile 59 may be driven up the ramps 48 and over the runways 46 and 53, the front wheels 60 of the vehicle coming to rest upon the rolls 26 and 28 carried by the turntables 12. In making the tests, as hereinafter more fully described, it is desirable to rotate the front wheels 60 to more closely simulate conditions which may be met with in practice and to accomplish this, rolls 28 are driven as hereinbefore described, whereby wheels 60 are rotated while the vehicle itself remains stationary. In certain of the tests, particularly in measuring caster, the wheels 60 are swung to the right and left a predetermined number of degrees from the straight-ahead position. This movement of the wheels may be conveniently accomplished by the movement of the turntables 12 upon the rollers 8 and the angle of swing may be ascertained by means of a scale 61 carried upon platform 10, the scale having calibrations 62 in terms of degrees and being read in conjunction with an index or pointer 63 (Fig. 2) carried by the turntable 12.

To measure caster, camber and kingpin inclination, the follwing apparatus is employed: A wheel clamp 64 (Figs. 2, 12, 13 and 14) is secured to each front wheel 60. Wheel clamp 64 comprises a substantially triangular casting 65 provided with apertures 66 and 67 in alignment with each other along the centerline of the casting. At two corners of the triangular casting integral arms 68 and 69 project diversely with respect to each other and in an offset direction with respect to the plane of the casting. Each arm 68 and 69 at its terminus carries a clamping jaw 70 having hook-like fingers 71 adapted to be engageable with spaced portions of wheel rim 72.

A block 73 is slidably positioned in aperture 66, said block being confined in said aperture against lateral movement by a plate 74 secured to the block by screws 75. Spaced bearings 76 and 77 are formed integral with casting 65 and support an elongated screw 78 which is rotatable in said bearings. A collar 79 is removably secured to screw 78 adjacent bearing 77 whereby longitudinal movement of screw 78 is prevented. An end of screw 78 carries threads 80 which are engageable with an internally threaded aperture provided with an integral extension of block 73 whereby rotation of screw 78, conveniently accomplished by knob 81 carried at an end of the screw, causes block 73 to move along the longitudinal axis of aperture 66. A pair of divergently spaced arms 82 are formed integral with the block 73, each of said arms carrying jaws 83 similar to jaws 70, the jaws 83 terminating in hook-like fingers 84 for engagement with rim 72.

To secure the clamp 64 to a wheel 60, the fingers 71 are engaged with spaced portions of rim 72 and fingers 84 will then be disposed adjacent substantially opposite portions of the rim. By manipulating screw 78 the block may be moved in aperture 66 so as to cause fingers 84 to securely engage the rim, traction being exerted against the oppositely engaged fingers 71.

A second block 85 is slidably positioned in aperture 67, said block carrying a retaining plate 86 secured thereto by screws 87. Block 85 carries a spindle 88 which projects outwardly from the block body and is adapted to carrying a testing head 89 (Figs. 2, 15, 16, 17 and 18) for a purpose to be hereinafter more fully described. At the rear face of block 85, flanges 89' are formed which, with plate 86, prevent lateral movement of the block within aperture 67. A clamping block 90 is carried adjacent the edge of one of the flanges 89', said clamping block being secured to casting 65 by means of screws 91 positioned in slots provided in the clamping block. An internally threaded boss 92 is formed integral with the casting 65 and is adapted for engagement with a threaded set-screw 93 having a knurled head 94, the arrangement being such that block 85 may be frictionally locked at a desired position within aperture 67 by the manipulation of screw 93 to urge clamping block 90 into snug contact with a flange 89'.

In employing the wheel clamp, after the clamp has been firmly secured to the wheel rim, block 85 may be moved within aperture 67 to position spindle 88 coaxially with the center of rotation of wheel 60. When this position is arrived at, the block 85 is frictionally locked by the manipulation of set-screw 93.

The testing head 89 comprises a pendant member 95 having a pair of spaced apertured lugs 96 at one end thereof, said lugs being engageable with spindle 88 when the head 89 is in operative position. A set screw 97 is carried by one of the lugs 96 whereby the pendant member may be rigidly secured to spindle 88, as is desired when making some tests. However, when measuring caster and camber, the spindle turns freely within lugs 96, the pendant member remaining substantially stationary while the spindle turns.

The pendant member 95 is provided with an enlarged circular aperture 98, and disposed diametrically across one face of the aperture an opaque strip 99 having a central restricted slot 100 is positioned. Disposed rearwardly from the strip 99 and visible through slot 100 is a fluorescent plastic member 101 which is substantially rectangular in shape and an edge of which is visible through slot 100. Slots 104 and 105 are provided in the pendant member for the reception of end portions 102 and 103, respectively, of the plastic member 101, and plates 106 and 107, respectively, confine the end portions 102 and 103 in said slots. Plates 106 and 107 in addition to functioning as retaining means, conveniently provide removable name plates for the device. The arrangement is such that the fluorescent material 101 presents when viewed through the slot 100 a line which is substantially at right-angles to the spindle 88.

A frame 108 is secured to the upper portions of the lugs 96, said frame being substantially of T-shape. A spirit level tube 109 is positioned in a recess 110 provided in the cross-portion of the T-shaped frame and a plate 111 having a central elongated slot 112 is positioned over the recess 110, the slot being disposed above the level tube 109 whereby the level bubble may be observed. The recess 110 may be filled with a hardened plastic material such as plaster of Paris or the like in which the level 109 may be unmovably embedded and the plate 111 on each side of slot 112 carries calibrations 113 and 114 whereby the position of the level bubble may be read.

In the staff-portion of the T-shaped frame 108 a pair of parallel recesses 115 and 116 are provided for the reception of spirit level tubes 117 and 118, respectively. Level tube 117 may be embedded in plastic material, such as, plaster of Paris or the like and the recess 115 may be closed by plate 119 provided with an elongated slot 120 through which the bubble in level tube 117 may be observed. The plate 119, adjacent slot 120, carries calibrations 121 upon which camber may be read. On the opposite side of the slot the legends "N" and "P" are inscribed to designate negative and positive camber on opposite sides of the index "0" of the calibrations 121.

In recess 116 a level tube frame 122 is positioned, said frame being supported upon a transverse pivot 123 whereby the frame is rockable within the recess. The frame 122 may be provided with a recess 124 in which a plastic material 125 is employed to hold the level tube 118 in place. The recess 124 may be closed at its top by plate 126 provided with slot 127 through which the bubble of the level tube may be observed. An adjusting screw 128 having a knurled head 129 is threadedly positioned in one end of the level tube frame 122, the end of said screw making contact, under the influence of spring 130, with the bottom wall of the recess 116 whereby the frame 122 and level tube 118 may be rocked to adjust the bubble to a predetermined position within the tube 118. The plate 126 carries calibrations 131 adjacent one side of slot 127 and at the opposite side of the slot the legends "N" and "P" are inscribed to designate negative and positive, respectively. The tube 118 may be employed in measuring caster of the wheels 60 in a manner to be hereinafter more fully described.

In measuring caster and camber the head 89 is so mounted upon spindle 88 as to permit rotation of the spindle while the head remains stationary. In measuring kingpin inclination the wheels 60 are not rotated and the head is locked upon the spindle 88 by set screw 97. The following describes the manner in which the present invention is employed to measure camber, caster and kingpin inclination.

In measuring camber, the wheel clamps are secured to the wheels as hereinbefore described, the spindles 88 being positioned in approximate alignment with the axes of rotation of the wheels. The wheels are disposed in a straight-ahead position during the test. The measuring heads 89 are positioned upon spindles 88 and the wheels 60 are rotated by the driving rolls 28, the spindles rotating freely within the apertured lugs 96. As each wheel rotates, the head 89 may vibrate upwardly and downwardly due to the fact that the portion of the rim to which the wheel clamps are secured may be bent or have "rim runout." Hence, the bubble within the tube 117 will oscillate between two extreme positions as indicated on the scale 121, the mean position of such oscillations read on the scale being the true camber of the wheel. Each wheel 60 may be rotated separately and the camber readings observed or both wheels may be rotated simultaneously and the camber readings may be observed by a single operator or both readings may be observed simultaneously by two operators.

In measuring caster the parts are arranged in the same manner as contemplated in the measurement of camber, wheels 60 are rotated and the head 89 remains substantially immovable insofar as rotation is concerned. The wheels may be swung through a predetermined angle away from the straight-ahead position in one direction (as indicated by scale 61 on platform 10). The level tube frame 122 may then be rocked by screw 128 to bring the bubble within tube 118 to its mean zero position on scale 131. The wheels 60 may then be swung through the same predetermined angle from the straight-ahead position in the opposite direction and the mean position of the bubble in tube 118 may be observed. The latter reading constitutes the caster reading. Of course, wheels 60 are continuously rotating during the caster reading operation and in this case the reading of each wheel may be made simultaneously or sequentially. The predetermined angle through which the wheels may be swung when measuring caster is in the neighborhood of 20° in each direction.

After the caster has been measured, the measurement may indicate that it is necessary to increase or decrease the caster angle. The scale 113 may be employed to facilitate this correction. Bearing in mind that positive caster is a backward tilt of the kingpin at the top, a pedal jack or other suitable means may be used to set the brakes of the vehicle. This is done so that when the kingpin is tilted during the correction of the caster the motion imparted to the kingpin will be transmitted to the rim of the wheel, that is, the tilting of the kingpin will result in an equal movement of the rim of the wheel. After caster has been measured the thumb screw 97 may be loosened and the zero of scale 113 may be set to the bubble of tube 109 and the thumb screw retightened. It can readily be seen that any subsequent adjustment of the caster angle of the vehicle will be recorded on the scale 113 so that the operator will know when the desired amount of correction has been made.

In measuring kingpin inclination, the wheels 60 are not rotated as for measuring camber and caster. The wheel to be measured is swung through a predetermined angle, preferably about 20°, in one direction away from the straight-ahead position and the thumb screw 97 loosened to set the zero of scale 114 upon the bubble of tube 109. The wheels are then swung through the same angle in the opposite direction from the straight-ahead position and the position of the bubble upon scale 114 is reading, giving the kingpin inclination reading.

In the measuring of camber and caster the head 89 will normally remain in a vertical direction unless too much friction exists at the lug bearings 96. This fact may be observed upon scale 113 and steps may be taken to correct the difficulty, since, the bubble within tube 109 should normally remain close to the zero on scale 113 during the camber and caster tests.

The calibrations 121 are preferably in true degrees of a circle, whereas, the art designates caster and kingpin inclination in arbitrary units which are proportional to true degrees of arc. In the case of the scales 114 and 131 the calibrations of the units have a ratio of 1.462, that is, one true degree of arc comprises 1.462 scale units. Of course, it is to be understood that any convenient calibrations may be employed on all of the scales.

In taking kingpin inclination measurements the wheels 60 are preferably locked against rotation. A brake pedal jack (not shown) is conveniently used for this purpose. Brake pedal jacks are well known in the art and are simply contrivances for holding the usual service brake pedal in "brake-on" position.

In checking the tracking characteristics of the vehicle and also in measuring toe-in of the front wheels 60, a telescope-mirror arrangement, to be hereinafter more fully described, is employed. The telescope 132 may be mounted upon spindle 88 and a mirror 133 may be mounted upon a supporting rod 134 (Fig. 2) or the telescope 132 may be mounted upon rod 134 (Fig. 1).

Figures 19, 20, 21:
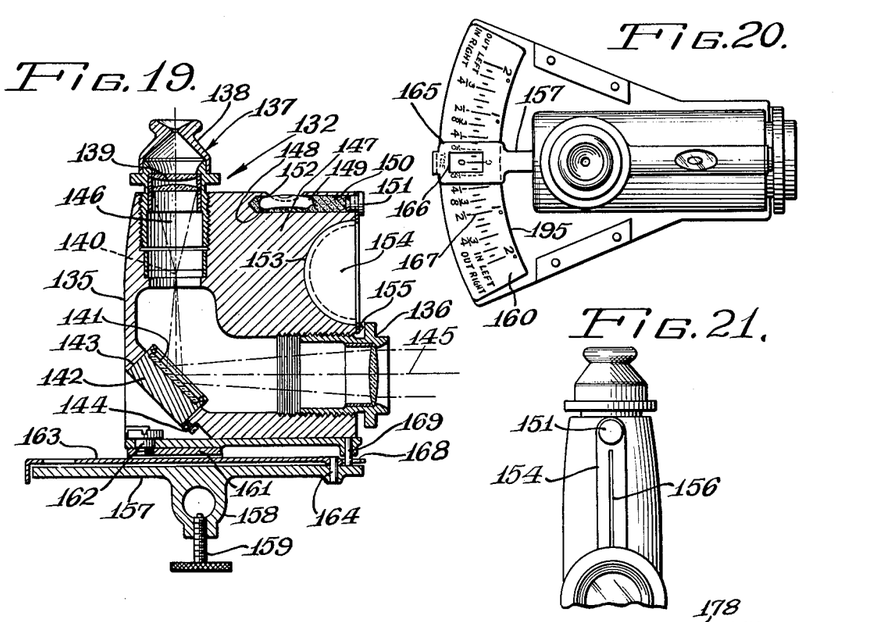
Figures 22, 23:
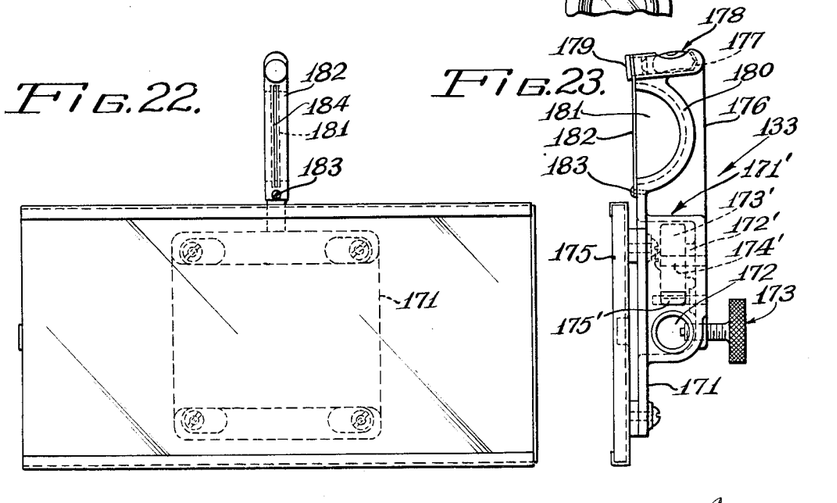
Figure 24:
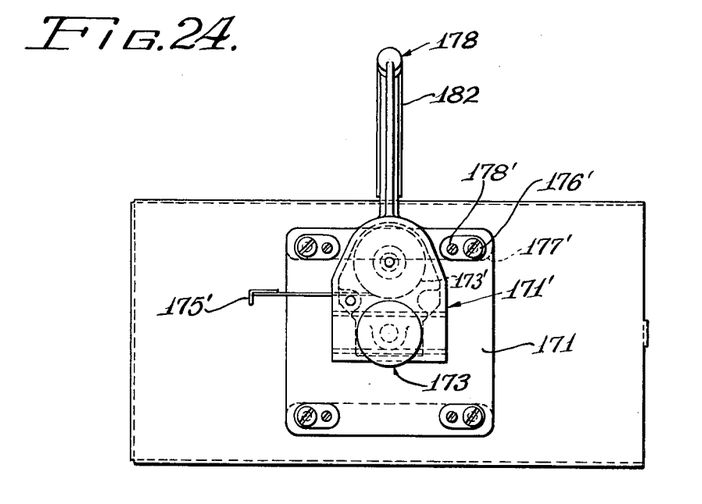
Fig. 24 is a rear elevational view of mirror assembly.
Figure 25:
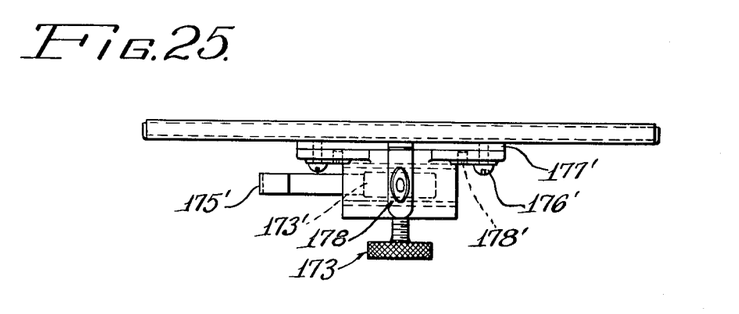
Fig. 25 is a top plan view of the mirror assembly.

Referring particularly to Figs. 19, 20 and 21, the details of construction of the telescope 132 are shown, wherein 135 comprises the telescope frame. The telescope 132 is of the right-angle type and the frame thereof carries an objective lens assembly 136 which is threadedly positioned in an aperture in the frame 135, the objective assembly being adjustable by rotating the same to move it inwardly and outwardly of the frame. An eyepiece assembly 137 comprises an eyepiece 138, lenses 139 and a cross hair reticle at 140 (Fig. 19), the focus of the lenses 139. A front silvered optically flat mirror 141 is carried by a holder 142 which is adjustably positioned in an aperture 143 provided in frame 135, the holder being locked in a desired position in the aperture by means of set-screw 144. The arrangement is such that the optical axis 145 of the objective lens intersects the optical axis 146 of the lenses 139 at the center of the mirror 141. The vertical image by virtue of the lens system would normally be inverted, but by the interpositioning of the mirror the vertical image, viewed at the eyepiece 137 by an operator standing at the rear of the instrument and looking downwardly, would be viewed in its upright position. The image, horizontally, is reversed, but, as will be hereinafter more fully described, the image being a vertical line, this reversal is not disadvantageous.

A web 147 comprising a portion of the frame 135 is disposed between the eyepiece assembly 137 and the objective assembly 136, said web being recessed, as at 148 (Fig. 19) to receive a spirit level 149. The spirit level 149 may be embedded in a plastic material 150, such as plaster of Paris or the like which may retain plug 151 in place and securely hold the level 149 in desired position. A recess 152 may be provided in the web whereby the level bubble may be observed.

The web 147 may also be recessed, as at 153 in Fig. 19, for the reception of a sheet of fluorescent plastic material 154 which may be secured in place by a slotted plate 154' which, in turn, is secured to the web by plug 151 and screw 155. The arrangement is such that an observer viewing telescope 132 from the front thereof will see a virtually illuminated vertical line 156.

A supporting platform 157 carries an apertured lug 158 in the aperture of which spindle 88 or rod 134 is adapted to fit, said lug carrying a set-screw 159 for securing the platform firmly upon said spindle or rod. An arcuate scale 160 is carried upon the upper face of the platform 152 at the rear of the telescope frame 135. A plate 161 is carried upon platform 157 and the telescope frame 135 is pivotally secured to said plate by shouldered screw 162. A pointer arm 163 is pivotally mounted upon platform 157, as at 164 in Fig. 19, and the remote end of said arm swings over scale 160. The outer end 165 of arm 163 is enlarged and is provided with an aperture 166 across which a cross hair is stretched, said cross hair being adapted to overlie calibrations 167 upon scale 160. The opposite end of arm 163 is provided with a slot 168 adjacent pivot 164 and a pin 169 carried by frame 135 extends into said slot.

The arrangement is such that when the frame 135 is pivoted about screw 162 thus changing the direction of the optical axis 145 of the objective lens, pin 169 moves arm 163 about pivot 164 thereby moving the head 165 over the scale 160. It can readily be seen that the movement of the telescope frame is thus multiplied as represented by the movement of arm 163 with respect to scale 160.

Referring particularly to Figs. 22, 23, 24 and 25 a mirror assembly 133 employed with the telescope 132 is shown. The mirror assembly 133 comprises a backing plate 171 having an integral cast housing 171' provided with an aperture 172, the rod 134 (Fig. 2) being adapted to engage in said aperture. A set screw 173 is threadedly positioned in the housing and is adapted to lock said plate upon the rod 134. A mirror frame is carried by said backing plate and, in turn, carries an optically flat mirror 175. A web 176 is formed integral with the backing plate, said web being provided with a recess 177 at its upper end adapted to house a spirit level 178. The spirit level 178 is embedded in a plastic material within said recess and the recess is adapted to be closed by a plug 179 which is held in place by the plastic material.

The web 176, above the mirror 175, is provided with a recess 180 in which a fluorescent plastic material 181 is positioned. The fluorescent material is held in place in the recess by a slotted strip 182 which in turn is secured to the web by plug 179 and screw 183. Similar to the arrangement hereinbefore described with respect to line 156, a virtually illuminated line 184 will be seen by an observer viewing the assembly from its front.

Housing 171' has an integral boss 172' upon which is mounted a spring retractable steel scale 173' of the usual coiled type. The scale is held on the boss 172' by means of a screw 174'. An aperture 175' is provided in the side of housing 171' to permit the scale to be extended from the housing.

The backing plate 171 is adjustably secured to the mirror frame by screws 176' threadedly engaged in bars 177' which in turn are rigidly secured to said frame. Said screws 178' may be adjusted to those depths to allow the mirror to be adjusted so that it is parallel to the axis of aperture 172.

Figures 2, 3:
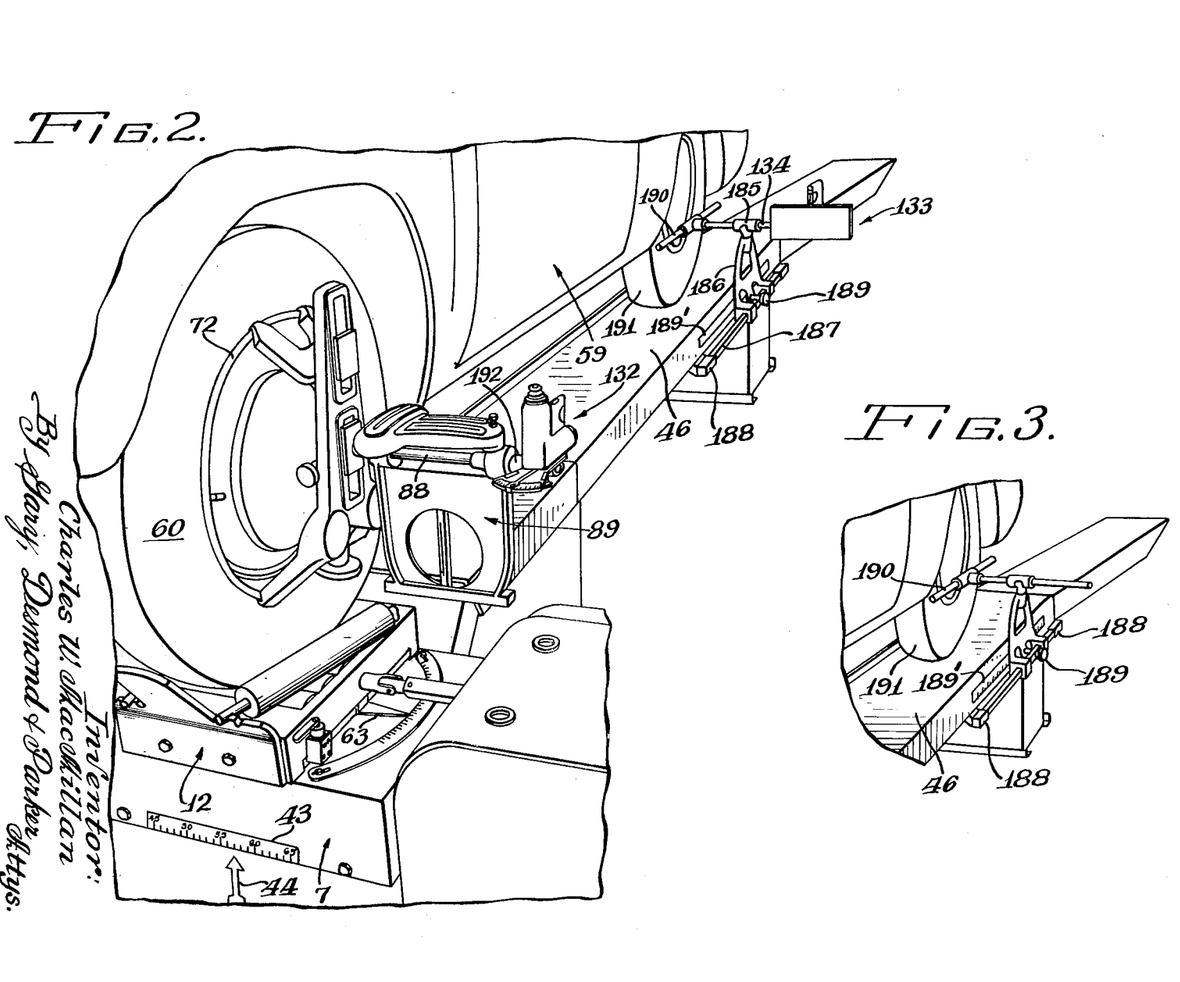
Fig. 2 is an enlarged detailed perspective view taken from one side thereof, an automotive vehicle being positioned in operative position on the machine.
Fig. 3 is a fragmentary perspective view of the rear side portion of the device.

Referring particularly to Figs. 2 and 3, rod 134 is slidably positioned in a swivel bearing 185 carried by a standard 186. Standard 186, in turn is slidably positioned upon a square sectioned rod 187 carried at one side of each runway 46 by supports 188 in which said rod is rotatably positioned. A spring loaded lock pin 189 holds standard 186 upright firmly when locked or allows the standard to rotate with rod 187 in supports 188 outwardly when unlocked, whereby the standard may be moved to a position to remove rod 134 from its location over the runway 46 when an automobile is moved onto or removed from the testing machine. A wheel-base gauge 189' is carried by the runway 46 whereby rod 134 may be set in vertical alignment with the axis of the rear wheels of the vehicle. A cross arm 190 is carried at the end of rod 134 and is positioned at right-angles to said rod. The cross arm 190 is adapted to be disposed in contacting relationship with the rear tire 191 whereby rod 134 will be disposed at right angles to the plane of the rear wheel.

In employing the telescope 132 and mirror 133 to check the tracking of the vehicle and to measure the toe-in of the front wheels 60, the vehicle is positioned upon the testing machine, as hereinbefore described. The testing heads 89 are positioned upon spindles 88 and sleeves 192 are placed on the spindles to hold the heads inwardly toward blocks 85. The telescope 132 is placed on the spindle up against sleeves 192. This then accurately locates the target line 156 of the telescopes at identical distances from the wheel rims 72 on each side of the vehicle. This distance is indicated by dimension B in Fig. 26.

Figure 26:
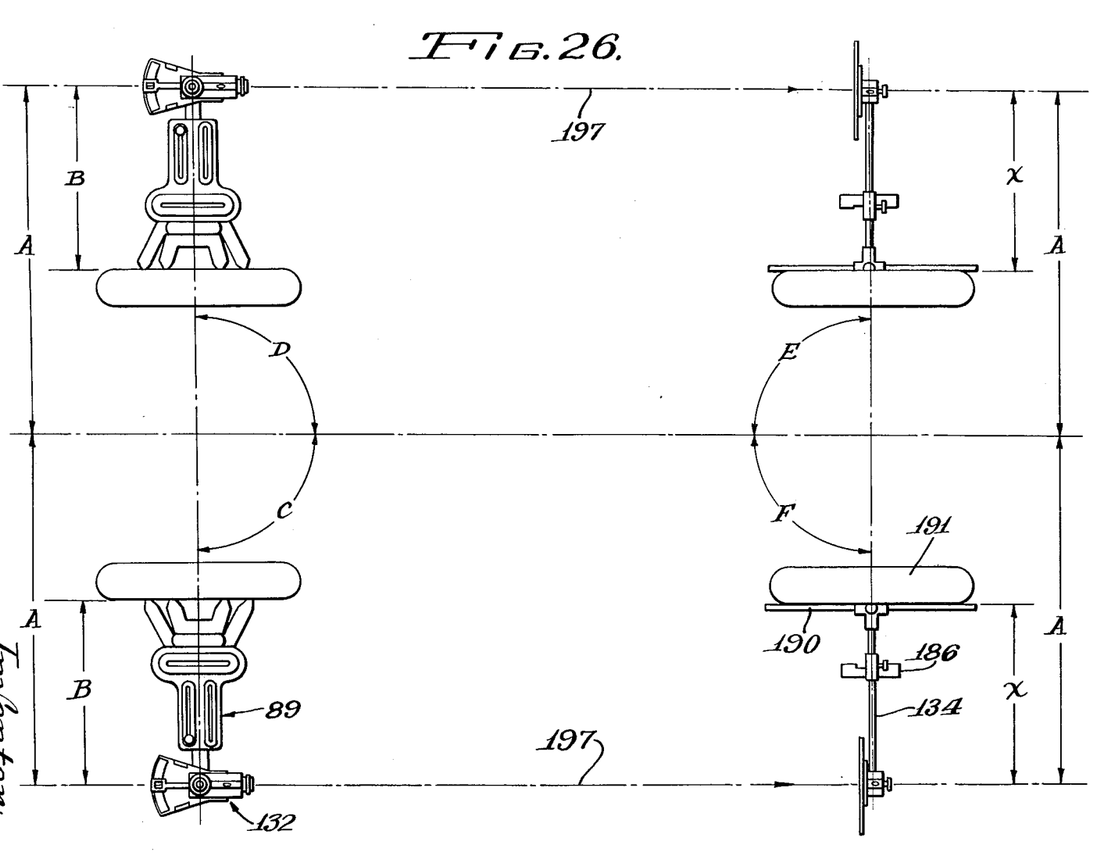
Fig. 26 is a diagrammatic view showing the arrangement of parts for checking "toe" and tracking of a vehicle.

The rear wheel contact bars 190 are then brought firmly against the sides of the rear wheels 191 and the mirror units 133 are placed on the rods 134. The steel scale 173' is used to set the mirror unit 133 at a predetermined distance from the rim of the rear wheel. This distance is shown as "X" in Fig. 26. Dimension "X" will vary, depending upon the make and model of vehicle; therefore it is convenient to have a chart which records the distance the edge of the housing 171' must be from some fixed spot, in this instance, the end of rod 134 on the contact bar assembly 190 for predetermined vehicles. When the distance "X" is correctly set the dimensions "A," Fig. 26, are equal.

The mirror assembly is adjusted so that the bubble in level tube 178 is centered thus placing the plane of the mirror 175 at the desired angle for reflecting the target lines 156 on the telescopes 132 back through the objectives 136 so as to make the same visible in an enlarged manner to the observer's eye at the eye-piece 138.

The procedure is then as follows: The pointer 165 of telescope 132 is set to zero on scale 160 and the wheel swung until the reticle hairline coincides with the target line 184 of the mirror assembly 133 on the same side of the vehicle. The amount of "toe" is measured on the other side of the vehicle by turning the telescope 132 using pointer 165 until the reticle hairline coincides with the target line 184 of mirror assembly 133 on that side of the vehicle. The "toe" is shown by the cross hair of pointer 165 on scale 160.

Tracking is checked by setting the pointer 165 of telescope 132 on zero of scale 160 and the wheel swung until the reticle hairline coincides with the target line 184.

The telescope is adjusted so that the target line 156 of the telescope 132 is reflected back through the objective 136. If the tracking is perfect the reflected target line 156 will appear directly below the mirror target line 184 and in alignment therewith. If the tracking is incorrect the reflected target line will appear at either side of the target line 184 depending on whether or not angle "F," Fig. 26, is greater or less than 90°. The same operation is repeated on the opposite side of the vehicle.

Tracking may also be checked by mounting the telescopes upon the opposite rods 134. With the heads 89 mounted upon the spindles 88, the line of sight from each telescope is aligned with each plastic member 101 through slot 100 in head 89. The pointer 165 associated with each telescope will give a predetermined reading. If the readings are the same but on opposite sides of the zero on scale 160, the frame of the vehicle is properly aligned. If, however, the readings vary by more than an allowable tolerance, for instance, three-eighths degree, it will indicate an error in tracking which should be corrected.

It is apparent that herein is described a testing device by which substantially all of the alignment angles, known to the art as the steering geometry of an automobile, may be tested; the device being simple in its construction, being extremely rugged and easy to operate.

I claim as my invention:

1. A device for testing the alignment characteristics of automotive vehicle wheels of the type comprising wheel clamps removably secured to the front wheels of a vehicle and a testing head carried by each wheel clamp and swingable with said clamp when the front wheels are swung, said device comprising a frame, carriages carried by said frame for supporting the front wheels of the vehicle, runways disposed transversely to said frame for supporting the rear wheels of the vehicle, a line target carried by each testing head, a bracket carried by each runway, a rod carried by each bracket for disposition at substantially right-angles to the plane of a rear wheel of the vehicle, a telescope movably carried by said rod for focusing on the line target of a testing head, and a scale carried by the rod adjacent said telescope for measuring the angle which the line of sight from the telescope to the line target makes with the plane of a rear wheel of the vehicle.

2. A device for testing the alignment characteristics of automotive vehicle wheels of the type comprising wheel clamps removably secured to the front wheels of a vehicle and a testing head carried by each wheel clamp and swingable with said clamp when the front wheels are swung, said device comprising a frame, carriages carried by said frame for supporting the front wheels of the vehicle, runways disposed transversely to said frame for supporting the rear wheels of the vehicle, a fluorescent line target carried by each testing head, a bracket carried by each runway, a rod carried by each bracket for disposition at substantially right-angles to the plane of a rear wheel of the vehicle, a telescope movably carried by said rod for focusing on the fluorescent line target of a testing head, and a scale carried by the rod adjacent said telescope for measuring the angle which the line of sight from the telescope to the fluorescent line target makes with the plane of a rear wheel of the vehicle.

3. A device for testing the alignment characteristics of automotive vehicle wheels of the type comprising wheel clamps removably secured to the front wheels of a vehicle and a spindle carried by each wheel clamp at substantially right-angles to the plane of the wheel and swingable with said clamp when the front wheels are swung, said device comprising a frame, carriages carried by said frame for supporting the front wheels of the vehicle, runways disposed transversely to said frame for supporting the rear wheels of the vehicle, a telescope pivotally carried on said spindle a predetermined distance from the wheel, a line target carried by said telescope, a bracket carried by each runway, a rod carried by each bracket for disposition at substantially right-angles to the plane of a rear wheel of the vehicle, a flat mirror carried by said rod a predetermined distance from the plane of the rear wheel for reflecting said line target back to said telescope, and a scale carried by said spindle adjacent said telescope for measuring the angle which the line of sight from the telescope to the mirror and back to the telescope line target makes with the plane of a front wheel.

4. A device for testing the alignment characteristics of automotive vehicle wheels of the type comprising wheel clamps removably secured to the front wheels of a vehicle and a testing head carried by each wheel clamp and swingable with said clamp when the front wheels are swung, said device comprising a frame, carriages carried by said frame for supporting the front wheels of the vehicle, runways disposed transversely to said frame for supporting the rear wheels of the vehicle, a line target carried by each testing head, a bracket carried by each runway, a rod carried by each bracket for disposition at substantially right-angles to the plane of a rear wheel of the vehicle, an angularly movable telescope carried by said rod for focusing on the line target of the testing head on the same side of the vehicle as the telescope, and a scale carried by the rod adjacent the angular movable path of said telescope for measuring the angle which the line of sight from the telescope to the line target makes with the plane of a rear wheel.

5. A device for testing the alignment characteristics of an automotive vehicle wheel comprising wheel clamps removably secured to the front wheels of an automotive vehicle and swingable with the front wheels when the front wheels are swung, a frame, carriages carried by said frame for supporting the front wheels of the vehicle, runways disposed transversely to said frame and in alignment with said carriages for supporting the rear wheels of the vehicle, an angularly movable telescope carried by each of said wheel clamps, a bracket carried by each runway adjacent the rear wheels of the vehicle, a rod carried by each bracket for disposition at substantially right-angles to the plane of each rear wheel, a mirror carried by each rod facing a respective telescope on the same side of the vehicle, a line target carried by each telescope, and a scale carried by the wheel clamp adjacent the angular movable path of each telescope for measuring the angle which the line of sight from the line target to the mirror and the reflected line of sight from the mirror to the telescope makes with the axis of rotation of the front wheels.

6. A device for testing the alignment characteristics of an automotive vehicle wheel comprising wheel clamps removably secured to the front wheels of an automotive vehicle and swingable with the front wheels when the front wheels are swung, a frame, carriages carried by said frame for supporting the front wheels of the vehicle, runways disposed transversely to said frame and in alignment with said carriages for supporting the rear wheels of the vehicle, an angularly movable telescope carried by each of said wheel clamps, a bracket carried by each runway adjacent the rear wheels of the vehicle, a rod carried by each bracket for disposition at substantially right-angles to the plane of each rear wheel, a mirror carried by each rod facing a respective telescope on the same side of the vehicle, a fluorescent line target carried by each telescope, and a scale carried by the wheel clamp adjacent the angular movable path of each telescope for measuring the angle which the line of sight from the fluorescent line target to the mirror and the reflected line of sight from the mirror to the telescope makes with the axis of rotation of the front wheels.

7. A device for testing the alignment characteristics of an automotive vehicle wheel comprising wheel clamps removably secured to the front wheels of an automotive vehicle and swingable with the front wheels when the front wheels are swung, a frame, carriages carried by said frame for supporting the front wheels of the vehicle, runways disposed transversely to said frame and in alignment with said carriages for supporting the rear wheels of the vehicle, an angularly movable telescope carried by each of said wheel clamps, a bracket carried by each runway adjacent the rear wheels of the vehicle, a rod carried by each bracket for disposition at substantially right-angles to the plane of each rear wheel, a line target carried by each rod a predetermined distance from each respective rear wheel, and a scale carried by the wheel clamp adjacent the angular movable path of each telescope for measuring the angle which the line of sight from the line target to the telescope makes with the axis of rotation of the front wheels.

8. A telescope member for use in checking the alignment characteristics of automotive vehicle wheels wherein a reflected line of sight is established from a mirror disposed in a predetermined position with respect to one of the vehicle wheels, said telescope member comprising a frame, means for mounting said frame in a predetermined position upon the other wheel of the vehicle on the same side of the vehicle, an optical system carried by said frame having lenses in optical alignment to form a telescope, a plate carried by said frame having a substanially vertical elongated restricted aperture in coplanar relationship with the optical axis of said lenses, a fluorescent plastic material disposed adjacent one face of said plate and visible through said aperture whereby said visible plastic is reflected as a virtually illuminated vertical line from said mirror to the optical axis of said telescope.

References Cited in the file of this patent

UNITED STATES PATENTS

| | | |
|---|---|---|
| 1,346,360 | White | July 13, 1920 |
| 1,378,632 | Swope | May 17, 1921 |
| 1,500,482 | Barrett | July 8, 1924 |
| 1,908,317 | Cadwell et al. | May 9, 1933 |
| 1,959,642 | Phelps | May 22, 1934 |
| 2,087,909 | Haucke | July 27, 1937 |
| 2,198,836 | Patton | Apr. 30, 1940 |
| 2,249,226 | Peters | July 15, 1941 |
| 2,581,630 | Carrigan | Jan. 8, 1952 |
| 2,601,262 | Carrigan | June 24, 1952 |
| 2,689,403 | Wilkerson | Sept. 21, 1954 |

FOREIGN PATENTS

| | | |
|---|---|---|
| 589,362 | Great Britain | June 18, 1947 |